US009043715B2

(12) United States Patent
Nolterieke et al.

(10) Patent No.: US 9,043,715 B2
(45) Date of Patent: May 26, 2015

(54) ALERT EVENT NOTIFICATION

(75) Inventors: Michael Nolterieke, Research Triangle Park, NC (US); Mark E. Molander, Research Triangle Park, NC (US); John P. Franks, Research Triangle Park, NC (US); Todd Eischeid, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 13/151,896

(22) Filed: Jun. 2, 2011

(65) Prior Publication Data
US 2012/0311473 A1   Dec. 6, 2012

(51) Int. Cl.
*G06F 3/048*   (2013.01)
*G06F 9/44*    (2006.01)
*G06F 3/0481*  (2013.01)

(52) U.S. Cl.
CPC ............ *G06F 9/4443* (2013.01); *G06F 3/0481* (2013.01)

(58) Field of Classification Search
CPC .................. G06F 3/0481; G06F 2203/04804; G06F 9/4443; G09G 51/14
USPC ......................................................... 715/768
See application file for complete search history.

(56) References Cited

U.S. PATENT DOCUMENTS

| 5,331,549 | A  | * | 7/1994  | Crawford, Jr. ................. | 600/513 |
| 5,675,755 | A  |   | 10/1997 | Trueblood                      |         |
| 5,877,763 | A  | * | 3/1999  | Berry et al. ................... | 715/803 |
| 6,025,841 | A  | * | 2/2000  | Finkelstein et al. .......... | 715/803 |
| 6,459,440 | B1 | * | 10/2002 | Monnes et al. ................ | 715/808 |
| 7,661,069 | B2 |   | 2/2010  | Lindsay et al.                 |         |
| 8,284,118 | B2 | * | 10/2012 | Perry et al. ........................ | 345/5 |
| RE44,241  | E  | * | 5/2013  | Gough et al. .................. | 345/156 |
| 2002/0024535 | A1 | * | 2/2002  | Ueno et al. .................... | 345/736 |
| 2002/0171682 | A1 | * | 11/2002 | Frank et al. .................... | 345/790 |
| 2003/0103072 | A1 | * | 6/2003  | Ko ................................ | 345/710 |
| 2005/0044500 | A1 | * | 2/2005  | Orimoto et al. ............... | 715/706 |
| 2008/0301577 | A1 | * | 12/2008 | Onda et al. .................... | 715/794 |
| 2009/0138811 | A1 |   | 5/2009  | Horiuchi et al.                |         |
| 2009/0282357 | A1 | * | 11/2009 | Schultz et al. ................. | 715/771 |
| 2010/0281423 | A1 |   | 11/2010 | Kano et al.                    |         |
| 2011/0087964 | A1 | * | 4/2011  | Patterson et al. ............. | 715/716 |
| 2011/0173539 | A1 | * | 7/2011  | Rottler et al. ................. | 715/727 |
| 2011/0314376 | A1 | * | 12/2011 | Dearman et al. .............. | 715/711 |
| 2014/0157162 | A1 | * | 6/2014  | Chaudhri et al. ............. | 715/768 |

* cited by examiner

*Primary Examiner* — Anil Bhargava
(74) *Attorney, Agent, or Firm* — Suiter Swantz pc llo

(57) ABSTRACT

Alert event notifications may be provided by: displaying a first user interface layer including at least one user interface element configured to provide an alert event notification; displaying a second user interface layer such that at least a portion of the second user interface layer overlays the at least one user interface element configured to provide an alert event notification; detecting an alert event; and at least partially displaying the at least one user interface element configured to provide an alert event notification in an area where the at least a portion of the second user interface layer overlays the at least one user interface element configured to provide an alert event notification.

20 Claims, 8 Drawing Sheets

ALERT EVENT NOTIFICATION

BACKGROUND

It may be the case that graphical user interfaces (UIs) display various windows at varying layers of depth in response to system and/or user inputs. Many times, key portions of a lower user interface layer may be hidden from view by flyover interfaces, pop-ups and application windows displayed as upper user interface layers overlaying those key portions of the lower user interface layer thereby preventing a user from viewing information associated with those portions of the lower user interface layer.

SUMMARY

Alert event notifications may be provided by: displaying a first user interface layer including at least one user interface element configured to provide an alert event notification; displaying a second user interface layer such that at least a portion of the second user interface layer overlays the at least one user interface element configured to provide an alert event notification; detecting an alert event; and at least partially displaying the at least one user interface element configured to provide an alert event notification in an area where the at least a portion of the second user interface layer overlays the at least one user interface element configured to provide an alert event notification.

BRIEF DESCRIPTION OF THE DRAWINGS

Figure Number:

1 depicts a system for providing alert event notifications;

Figure 1:
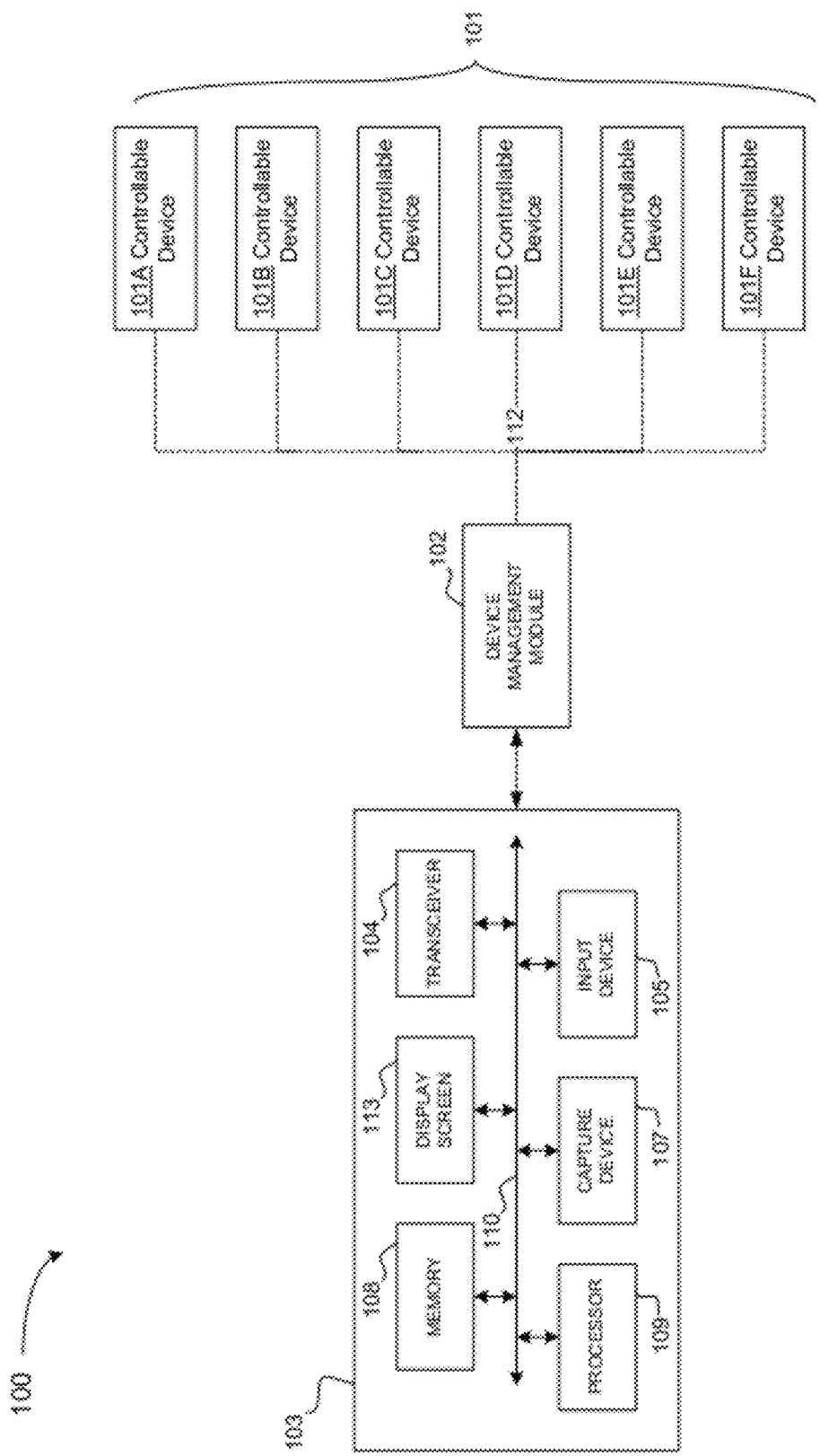

2 depicts a user interface for providing alert event notifications;

3 depicts a user interface for providing alert event notifications;

4 depicts a method for providing alert event notifications;

5 depicts a user interface for providing alert event notifications;

6 depicts a user interface for providing alert event notifications;

7 depicts a user interface for providing alert event notifications; and 8 depicts a user interface for providing alert event notifications.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

As described above, UIs may be configured with varying levels of display depth. It may be the case that key portions of a lower user interface layer may be hidden from view by upper user interface layers thereby preventing a user from viewing information associated with those portions of the lower user interface layer. As such, the present invention is directed to systems and methods for providing alert notifications associated with lower user interface layers when portions of those lower user interface layers configured to display such alert notifications are overlaid by an upper user interface layer.

FIG. 1 depicts an exemplary system 100 for monitoring and/or controlling one or more controllable devices 101. At least in the illustrated embodiment, system 100 includes a device management module 102 configured to control at least one controllable device 101. The device management module 102 may be external to or included as a portion of controllable device 101. The system 100 may further include a computing device 103 (e.g. a touch-screen enabled tablet computer, smart phone, desktop computer, and the like) in communication with device management module 102.

The computing device 103 may include a transceiver 104, one or more input devices 105, a display screen 106 (e.g. a touch-sensitive display screen), one or more capture devices 107, a memory 108, and a processor 109 coupled to one another via a bus 110 (e.g., a wired and/or wireless bus).

The transceiver 104 may be any system and/or device capable of communicating (e.g., transmitting and receiving data and/or signals) with device management module 102. The transceiver 104 may be operatively connected to device management module 102 via a wireless (e.g. Wi-Fi, Bluetooth, cellular data connections, etc.) or wired (Ethernet, etc.) connection.

The one or more input devices 105 may be any system and/or device capable of receiving input from a user. Examples of input devices 105 include, but are not limited to, a mouse, a key board, a microphone, a selection button, and the like. In various embodiments, each input device 105 is in communication with display screen 106. In other embodiments, the display screen 106 is itself, an input device 105 as in the case of a touch-sensitive display screen.

In various embodiments, the display screen 106 may be configured to display data received from controllable devices 101, device management module 102, input devices 105, one or more capture devices 107, etc.

The capture devices 107 may be any system and/or device capable of capturing environmental inputs (e.g., visual inputs, audio inputs, tactile inputs, etc.). Examples of capture devices 107 include, but are not limited to, a camera, a microphone, a global positioning system (GPS), a gyroscope, a plurality of accelerometers and the like.

The memory 108 may be any system and/or device capable of storing data. In one embodiment, memory 108 stores computer code that, when executed by processor 109, causes processor 109 to perform a method for controlling one or more controllable devices 101.

As shown in FIGS. 1-3 and 5-8, the computing device 103 may be configured (e.g. running software and/or firmware stored in memory 108; employing application specific circuitry) to display a first UI layer 111A (e.g. display by the display screen 106). The computing device 103 and the controllable devices 101 may transceive control signals 112 according to one or more user inputs received by the computing device 103 or according to one or more commands issued by one or more controllable devices 101.

Figure 2:
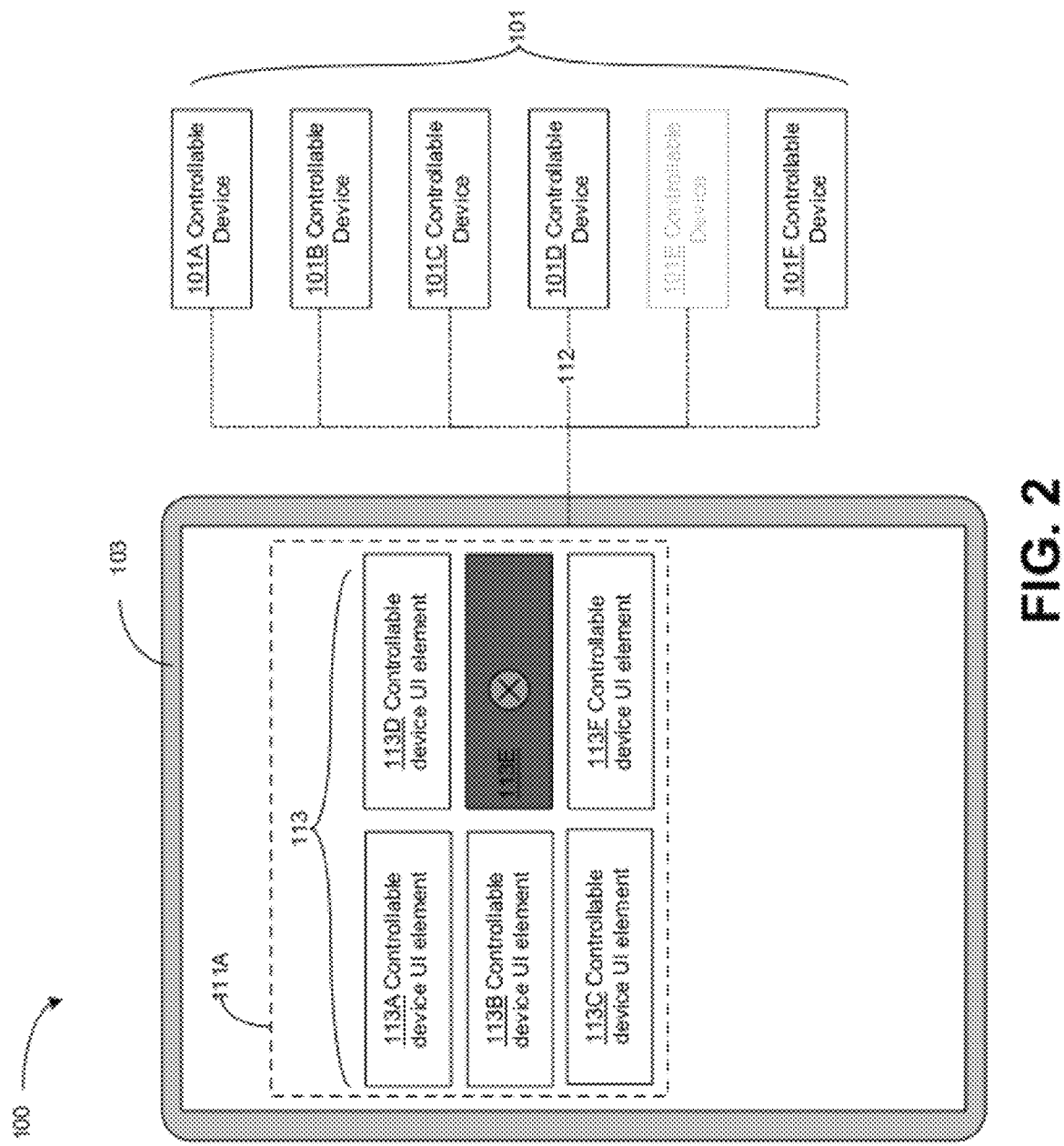

For example, as shown in FIG. 2, a UI layer 111 may be provided that is associated with the status of one or more controllable devices 101 (e.g. a server node chassis). The UI layer 111A may display one or more controllable device UI elements 113 each associated with at least one controllable device 101. For example, the UI layer 111A may display controllable device UI elements 113 (e.g. controllable device UI elements 113A-113G) representing an error status of controllable devices 101 (e.g. controllable devices 101A-101G, respectively). Upon detection of an alert event associated with a controllable device 101 (e.g. a drive failure of a controllable device 101), the UI layer 111A may display an alert event notification associated with the controllable device UI element 113 (e.g. changing the color of a controllable device UI element 113, flashing a controllable device UI element 113, displaying an alert icon associated with the controllable device UI element 113, or otherwise modifying the appearance of the controllable device UI element 113) associated with that controllable device 101. For example, in the case of a failure of controllable device 101E, an alert event notification (e.g. an x-out) associated with the controllable device UI element 113E may be displayed.

Figure 3:
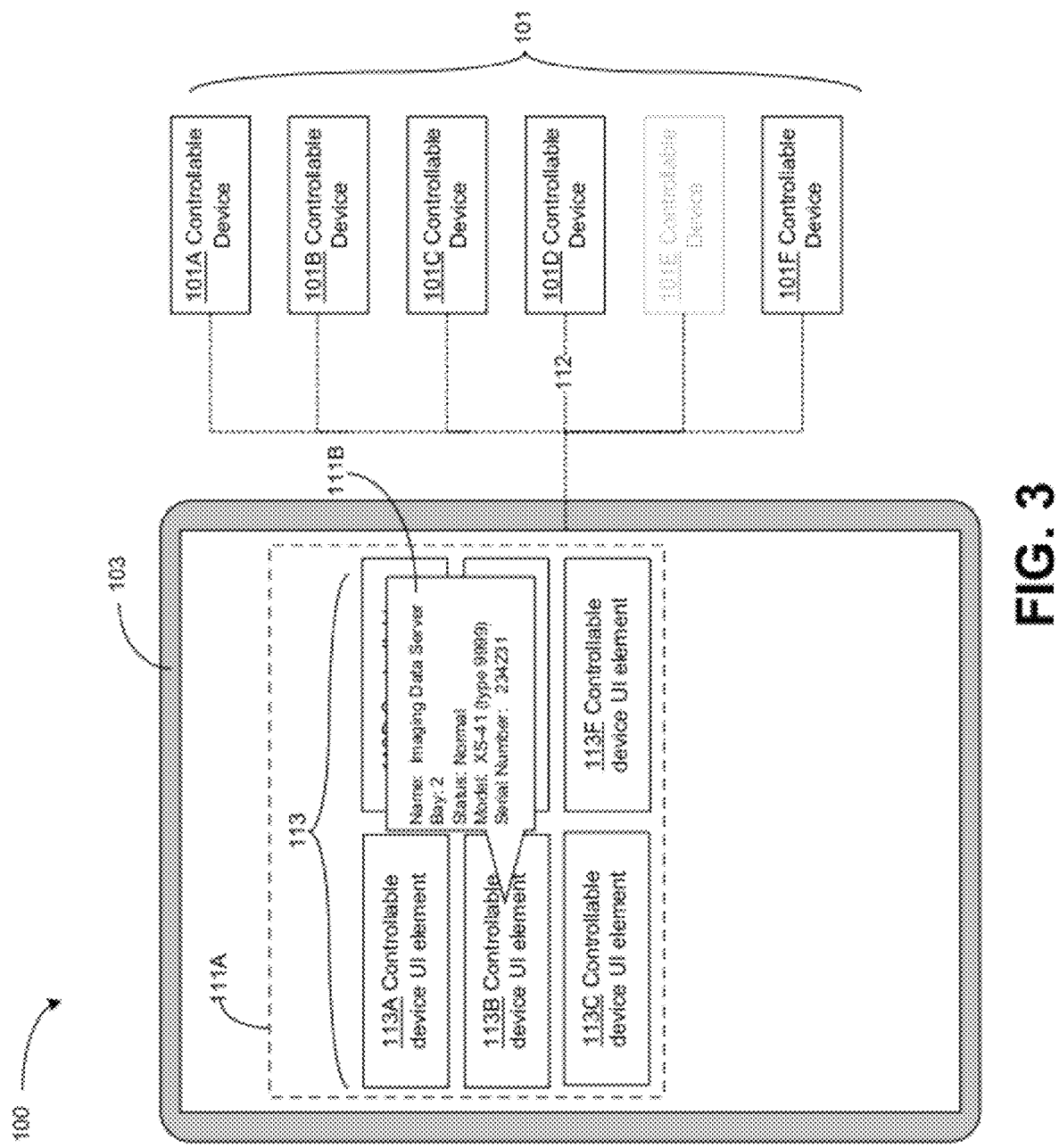

Referring to FIG. 3, it may be the case that during usage of the computing device 103, either a user input or a system function (e.g. a cursor hover, a mouse click, system notification, and the like) may cause the computing device 103 to display a second UI layer 111B which at least partially overlays the first UI layer 111A. As shown in FIG. 3, the second UI layer 111B may at least partially prevent viewing of the controllable device UI element 113E of the UI layer 111A and its associated alert event notification.

As such, it may be desirable to provide a user interface which may display an alert event notification associated with a controllable device UI element 113 of a lower UI layer when that controllable device UI element 113 is overlaid by an upper UI layer.

Figure 4:
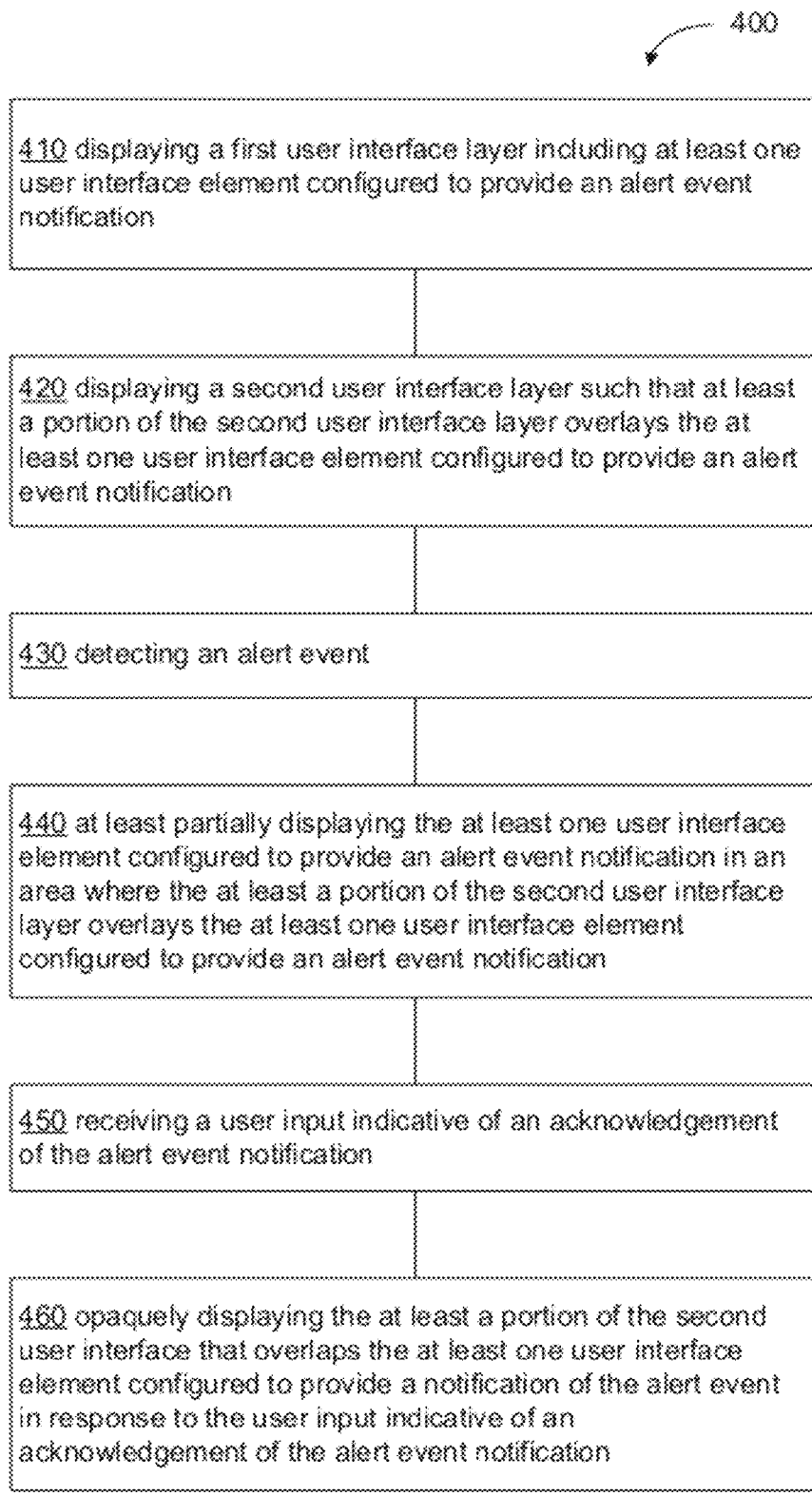

FIG. 4 illustrates an operational flow 400 representing user interface display operations for presenting alert event notifications. Discussion and explanation of the operations of FIG. 4 may be provided with respect to the examples of FIGS. 1-3 and 5-8, and/or with respect to other examples and contexts. However, it should be understood that the operational flows may be executed in a number of other environments and contexts, and/or in modified versions of FIGS. 1-3 and 5-8. In addition, although the various operational flows are presented in the sequence(s) illustrated, it should be understood that the various operations may be performed in other orders than those that are illustrated, or may be performed concurrently.

Operation 410 illustrates displaying a first user interface layer including at least one user interface element configured to provide an alert event notification. For example, as shown in FIG. 2, a display screen 106 of the computing device 103 may display a UI layer 111A including controllable device UI elements 113 (e.g. controllable device UI elements 113A-113G) representing an error status of controllable devices 101 (e.g. controllable devices 101A-101G, respectively). Specifically, the controllable devices 101 may include at least one of a server device, a server tray and a server rack and the state of the controllable device UI elements 113 may be indicative of an error status of the a server device, a server tray and a server rack.

Operation 420 illustrates displaying a second user interface layer such that at least a portion of the second user interface layer overlays the at least one user interface element configured to provide an alert event notification. For example, as shown in FIG. 3, in response to either a user input or a system function (e.g. a cursor hover, a mouse click, and the like) the computing device 103 may display a second UI layer 111B which at least partially overlays the first UI layer 111A. For example, when a user hovers a cursor over a controllable device UI element 113 (e.g. controllable device UI element 113B) of the UI layer 111A, the display screen 106 of the computing device 103 may display status information (e.g. device name, drive bay, etc.) regarding a controllable device 101 associated with the controllable device UI element 113. As shown in FIG. 3, in order to display the status information in a location substantially proximate to a selected controllable device UI element 113 to facilitate viewing, the second UI layer 111B may at least partially overlap with one or more adjacent controllable device UI elements 113 (e.g. controllable device UI elements 113D and E) thereby preventing viewing of portions of those controllable device UI element 113.

Figure 5:
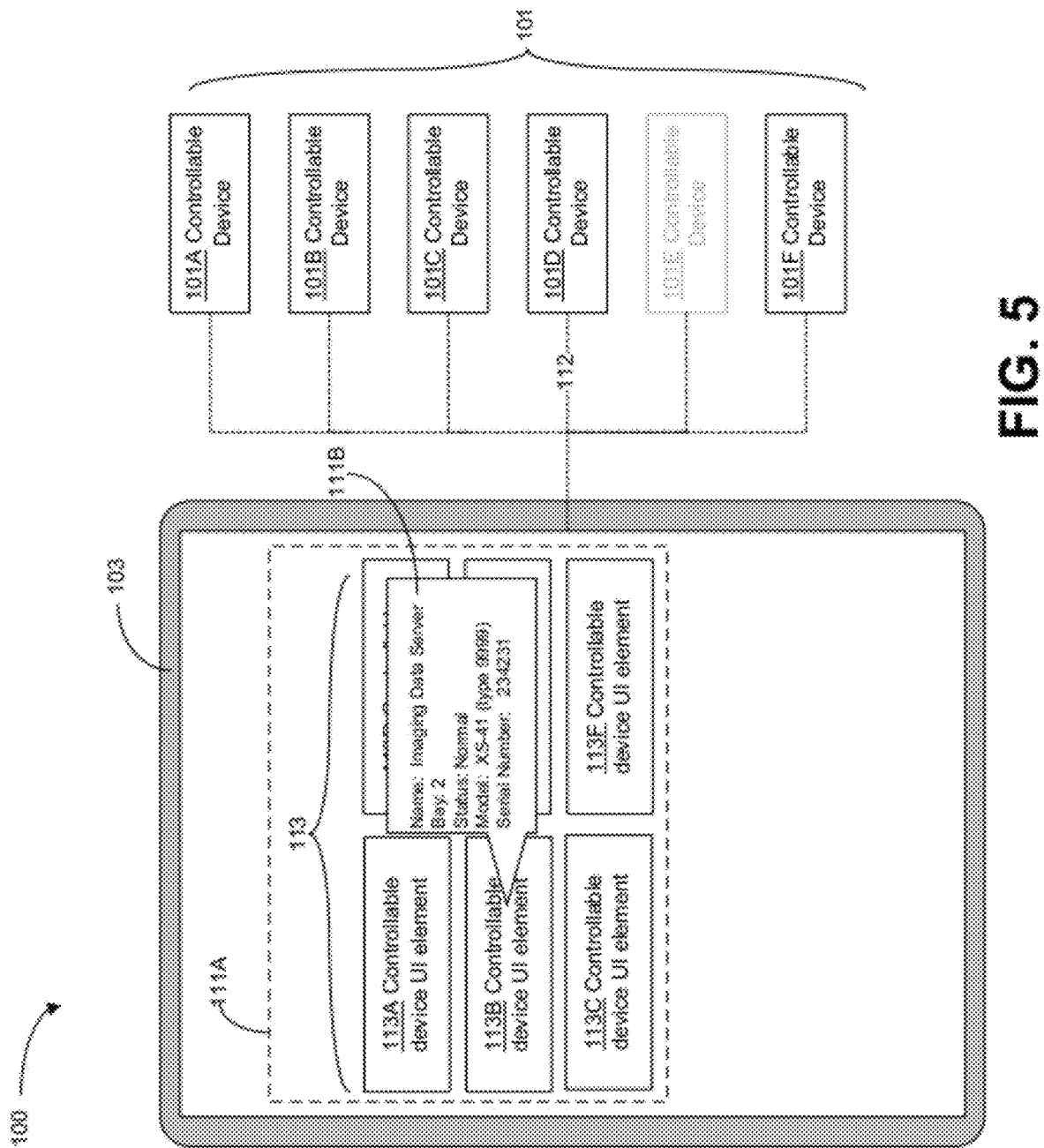

Operation 430 illustrates detecting an alert event. For example, as shown in FIG. 5, the device management module 102 may monitor the operational status of the controllable devices 101 in order to provide user notifications regarding error events (e.g. data read/write failures, controllable device subsystem health, power failures, overheating, etc.) occurring within the controllable devices 101 for which an alert is to be provided to a user. Upon an occurrence of an error event within a controllable device 101 (e.g. a failure of a controllable device 101E), the device management module 102 may detect one or more control signals 112 indicative of such an error event from that controllable device 101. The device management module 102 may, in turn, provide an alert event signal to the computing device 103 directing the computing device 103 to display a user notification indicative of the alert event.

Figure 6:
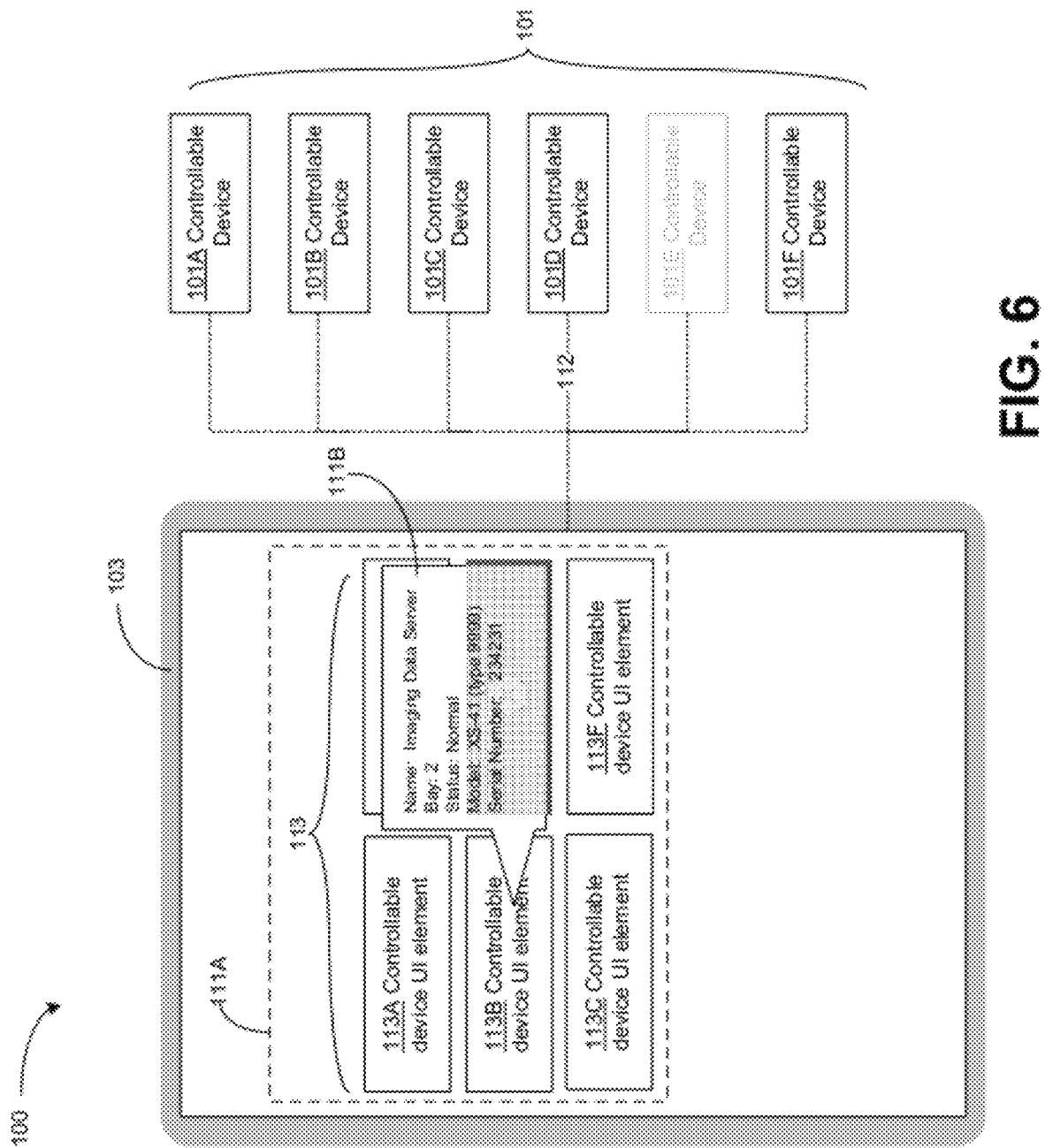
Figure 7:
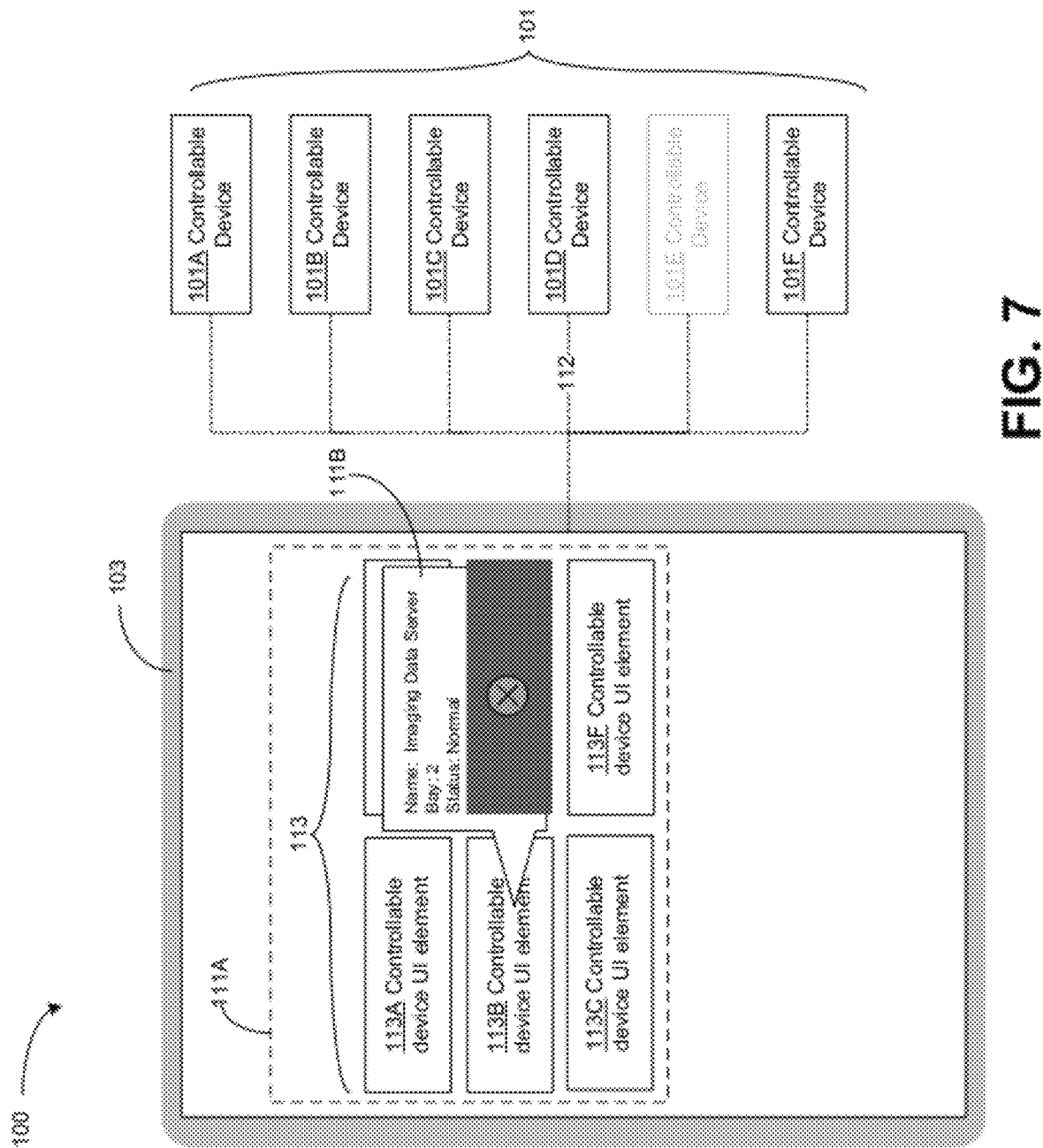

Operation 440 illustrates at least partially displaying the at least one user interface element configured to provide an alert event notification in an area where the at least a portion of the second user interface layer overlays the at least one user interface element configured to provide an alert event notification. As described above with respect to Operation 420, during general operations, the computing device 103 may display a second UI layer 111B which at least partially overlays controllable device UI elements 113 of the first UI layer 111A. However, upon a detection of an alert event associated with a controllable device 101, the computing device 103 may at least partially display the controllable device UI element 113 associated with the controllable device 101 to allow the controllable device UI element 113 to display an alert event notification. In one example, the computing device 103 may translucently display a controllable device UI element 113 that is providing an alert event notification. As shown in FIG. 6, the portion of the controllable device UI element 113 which underlies the second UI layer 111B may show through the second UI layer 111B in a translucent manner where portions of the second UI layer 111B remain visible but the alert event notification characteristics (e.g. a change in color of the controllable device UI element 113) may be at least partially viewed within the second UI layer 111B as well. Alternately, as shown in FIG. 7, the portion of the controllable device UI element 113 which underlies the second UI layer 111B may show through the second UI layer 111B in an opaque manner where the alert event notification characteristics (e.g. a change in color of the controllable device UI element 113) may be fully viewed while the portions of the second UI layer 111B remain hidden. Further, as shown in FIGS. 6 and 7, it may be the case that only those portions of the controllable device UI element 113 providing an alert event notification may show through the second UI layer 111B while the remaining portions of the UI layer 111A (e.g. controllable device UI element 113D) may remain hidden beneath the second UI layer 111B.

Figure 8:
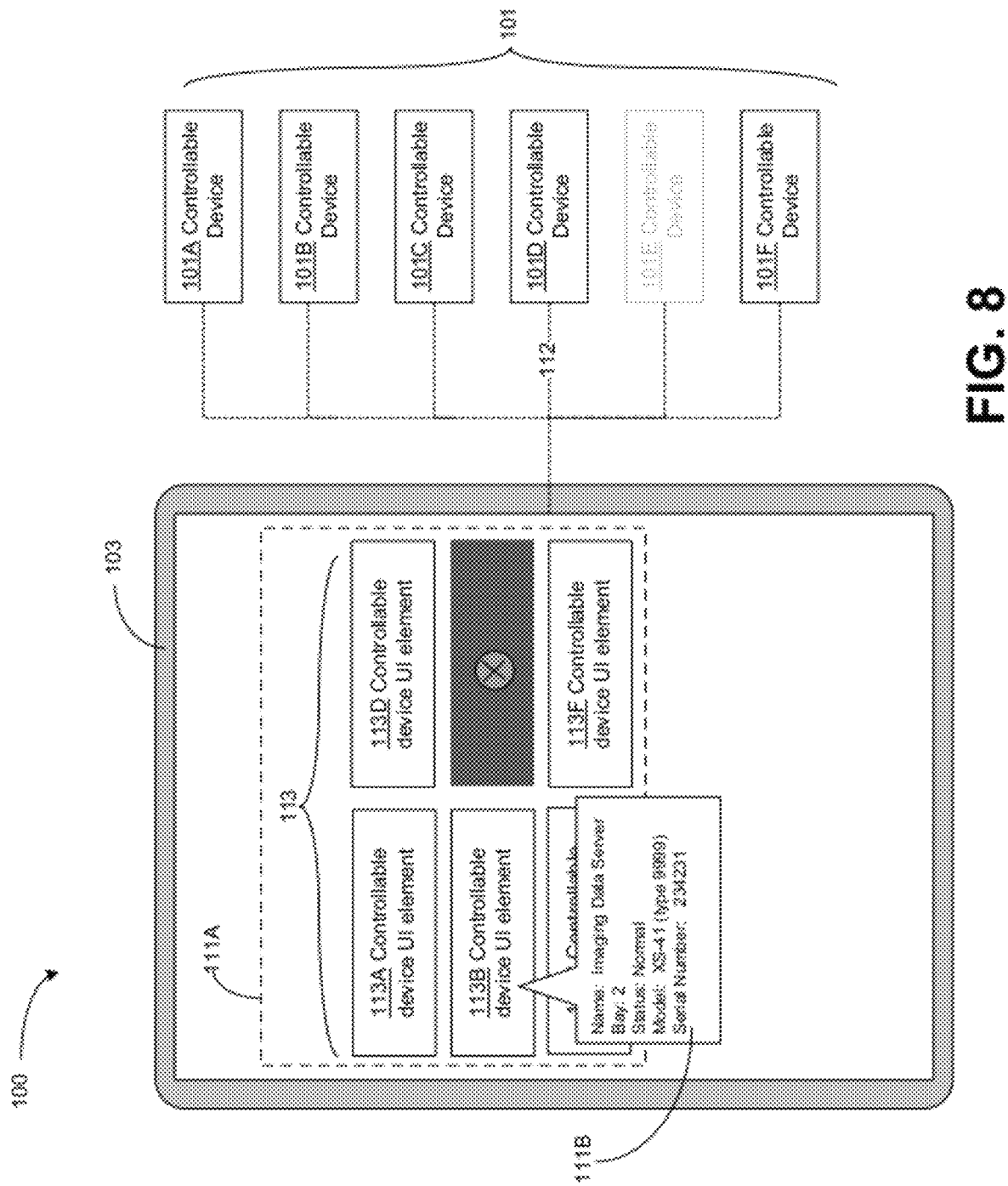

Still further, as described above with respect to Operation 420, during general operations the computing device 103 may display a second UI layer 111B in a location substantially proximate to a selected controllable device UI element 113 to facilitate viewing. As such, the second UI layer 111B may at least partially overlap with one or more adjacent controllable device UI elements 113 (e.g. controllable device UI elements 113D and E) thereby preventing viewing of portions of those controllable device UI element 113. Upon a detection of an alert event associated with a controllable device 101, the computing device 103 may modify a display location of the second UI layer 111B from a position that overlays the controllable device UI element 113 (as shown in FIG. 3) to a position that does not overlay the controllable device UI element 113 (as shown in FIG. 8).

Operation 450 illustrates receiving a user input indicative of an acknowledgement of the alert event notification. For example, as shown in FIGS. 6-8, upon a detection of an alert event associated with a controllable device 101, the computing device 103 may at least partially display the controllable device UI element 113 associated with the controllable device 101 to allow the controllable device UI element 113 to display an alert event notification. The display of the alert notification may be a persistent display where the notification remains displayed until some action is taken by a user to acknowledge the alert event notification. For example, the computing device 103 may receive a user input (e.g. a touch screen contact, mouse click, etc.) that is substantially proximate to a location on the UI layer 111 where a controllable device UI element 113 is displayed.

Operation 460 illustrates opaquely displaying the at least a portion of the second user interface that overlaps the at least one user interface element configured to provide a notification of the alert event in response to the user input indicative of an acknowledgement of the alert event notification. Upon receipt of a user input indicative of an acknowledgement of the alert notification (as in Operation 450), the computing device 103 may again display the second UI layer 111B in an opaque manner with respect to the controllable device UI element 113 such as shown in FIG. 3. Specifically, the portion of the controllable device UI element 113 which underlies the second UI layer 111B may not show through the second UI layer 111B.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

More specifically, it will be recognized that, while described in the context of user interfaces configured to control one or more controllable devices, the above described systems and methods may be employed in any number of contexts without departing from the scope of the described invention. For example, the above-described operations associated with the hierarchical display of user interface elements may be employed in any context where data and sub-data providing additional details regarding that data are to be displayed. Similarly, the above-described operations associated with the sorting of user interface elements may be employed in any context where user interface elements are displayed in a list format.

Although specific dependencies have been identified in the claims, it is to be noted that all possible combinations of the features of the claims are envisaged in the present application, and therefore the claims are to be interpreted to include all possible multiple dependencies. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for providing alert event notifications comprising:
    displaying a first user interface layer including at least one user interface element configured to provide an alert event notification;
    overlaying at least a portion of a second user interface layer over at least a portion of the at least one user interface element configured to provide an alert event notification such that the at least a portion of a second user interface layer prevents viewing of the at least one user interface element configured to provide an alert event notification;
    detecting an alert event;
    overlaying the at least one user interface element configured to provide an alert event notification over at least a portion of the second user interface layer in response to the alert event;
    receiving a user input indicative of an acknowledgement of the alert event notification; and
    opaquely overlaying at least a portion of the second user interface over at least a portion of the at least one user interface element configured to provide a notification of the alert event in response to the user input indicative of an acknowledgement of the alert event notification.

2. The method of claim 1, wherein the overlaying the at least one user interface element configured to provide an alert event notification over at least a portion of the second user interface layer in response to the alert event includes:
    translucently overlaying the at least one user interface element configured to provide an alert event notification over at least a portion of the second user interface in response to the alert event.

3. The method of claim 1, wherein the overlaying the at least one user interface element configured to provide an alert event notification over at least a portion of the second user interface layer in response to the alert event includes:
    opaquely overlaying the at least one user interface element configured to provide an alert event notification over at least a portion of the second user interface in response to the alert event.

4. The method of claim 1, further comprising:
    modifying a display location of the second user interface in response to the alert event.

5. The method of claim 1, wherein the overlaying the at least one user interface element configured to provide an alert event notification over at least a portion of the second user interface layer in response to the alert event includes:
    overlaying the at least one user interface element configured to provide an alert event notification over at least a portion of the second user interface layer in response to the alert event when the alert event notification is in an unacknowledged state.

6. The method of claim 1, wherein the at least one user interface element configured to provide an alert event notification includes:
    at least one user interface element configured to provide an alert event notification associated with a status of at least one controllable device.

7. The method of claim 6, wherein the at least one controllable device is at least one of a server device, a server tray, and a server rack.

8. The method of claim 6, wherein the status of the at least one controllable device includes at least one of:
    a data read/write failure associated with the at least one controllable device; controllable device health status; a power failure status associated with the at least one controllable device; or an overheating associated with the at least one controllable device.

9. A system for providing alert event notifications comprising:
- means for displaying a first user interface layer including at least one user interface element configured to provide an alert event notification;
- means for overlaying at least a portion of a second user interface layer over at least a portion of the at least one user interface element configured to provide an alert event notification such that the at least a portion of a second user interface layer prevents viewing of the at least one user interface element configured to provide an alert event notification;
- means for detecting an alert event;
- means for overlaying the at least one user interface element configured to provide an alert event notification over at least a portion of the second user interface layer in response to the alert event;
- means for receiving a user input indicative of an acknowledgement of the alert event notification; and
- means for opaquely overlaying at least a portion of the second user interface over at least a portion of the at least one user interface element configured to provide a notification of the alert event in response to the user input indicative of an acknowledgement of the alert event notification.

10. The system of claim 9, wherein the means for overlaying the at least one user interface element configured to provide an alert event notification over at least a portion of the second user interface layer in response to the alert event includes:
- means for translucently overlaying the at least one user interface element configured to provide an alert event notification over at least a portion of the second user interface in response to the alert event.

11. The system of claim 9, wherein the means for overlaying the at least one user interface element configured to provide an alert event notification over at least a portion of the second user interface layer in response to the alert event includes:
- means for opaquely overlaying the at least one user interface element configured to provide an alert event notification over at least a portion of the second user interface in response to the alert event.

12. The system of claim 9, wherein the means for overlaying the at least one user interface element configured to provide an alert event notification over at least a portion of the second user interface layer in response to the alert event includes:
- modifying a display location of the second user interface in response to the alert event.

13. The system of claim 9, wherein the overlaying the at least one user interface element configured to provide an alert event notification over at least a portion of the second user interface layer in response to the alert event includes:
- overlaying the at least one user interface element configured to provide an alert event notification over at least a portion of the second user interface layer in response to the alert event when the alert event notification is in an unacknowledged state.

14. The system of claim 9, wherein the at least one user interface element configured to provide an alert event notification includes:
- at least one user interface element configured to provide an alert event notification associated with a status of at least one controllable device.

15. The system of claim 14, wherein the controllable device is at least one of a server device, a server tray, and a server rack.

16. A system including:
- at least one processing device; and
- at least one memory device including instructions for:
  - displaying a first user interface layer including at least one user interface element configured to provide an alert event notification;
  - overlaying at least a portion of a second user interface layer over at least a portion of the at least one user interface element configured to provide an alert event notification such that the at least a portion of a second user interface layer prevents viewing of the at least one user interface element configured to provide an alert event notification;
  - detecting an alert event;
  - overlaying the at least one user interface element configured to provide an alert event notification over at least a portion of the second user interface layer in response to the alert event;
  - receiving a user input indicative of an acknowledgement of the alert event notification; and
  - opaquely overlaying at least a portion of the second user interface over at least a portion of the at least one user interface element configured to provide a notification of the alert event in response to the user input indicative of an acknowledgement of the alert event notification.

17. The system of claim 16, wherein the overlaying the at least one user interface element configured to provide an alert event notification over at least a portion of the second user interface layer in response to the alert event includes:
- translucently overlaying the at least one user interface element configured to provide an alert event notification over at least a portion of the second user interface in response to the alert event.

18. The system of claim 16, wherein the overlaying the at least one user interface element configured to provide an alert event notification over at least a portion of the second user interface layer in response to the alert event includes:
- opaquely overlaying the at least one user interface element configured to provide an alert event notification over at least a portion of the second user interface in response to the alert event.

19. The system of claim 16, further comprising an instruction of:
- modifying a display location of the second user interface in response to the alert event.

20. The system of claim 16, wherein the overlaying the at least one user interface element configured to provide an alert event notification over at least a portion of the second user interface layer in response to the alert event includes:
- overlaying the at least one user interface element configured to provide an alert event notification over at least a portion of the second user interface layer in response to the alert event when the alert event notification is in an unacknowledged state.

* * * * *